(12) United States Patent
Manthoulis et al.

(10) Patent No.: US 7,610,361 B2
(45) Date of Patent: Oct. 27, 2009

(54) SYSTEM AND METHOD FOR ETHERNET NETWORK DESIGN

(75) Inventors: Orestis Manthoulis, Sausalito, CA (US); Laxman Sahasrabuddhe, San Ramon, CA (US); Mung Chiang, Princeton, NJ (US)

(73) Assignee: AT&T Intellectual Property I, L.P., Reno, NV (US)

( * ) Notice: Subject to any disclaimer, the term of this patent is extended or adjusted under 35 U.S.C. 154(b) by 826 days.

(21) Appl. No.: 10/751,683

(22) Filed: Jan. 5, 2004

(65) Prior Publication Data

US 2005/0188059 A1   Aug. 25, 2005

(51) Int. Cl.
*G06F 15/177* (2006.01)
*G06F 3/048* (2006.01)

(52) U.S. Cl. ........................ 709/220; 715/735
(58) Field of Classification Search ................. 709/223, 709/21, 220; 703/2, 21; 370/353, 354; 379/201.12; 715/733–735

See application file for complete search history.

(56) References Cited

U.S. PATENT DOCUMENTS

| | | | | | |
|---|---|---|---|---|---|
| 5,067,148 | A | * | 11/1991 | Sardana | 379/111 |
| 5,831,610 | A | * | 11/1998 | Tonelli et al. | 715/735 |
| 6,223,220 | B1 | * | 4/2001 | Blackwell et al. | 709/223 |
| 6,564,258 | B1 | * | 5/2003 | Uniacke | 709/223 |
| 6,661,885 | B1 | * | 12/2003 | McCurdy et al. | 379/201.12 |
| 6,950,865 | B1 | * | 9/2005 | Depaolantonio | 709/223 |
| 7,010,471 | B2 | * | 3/2006 | Rosenberg | 703/2 |
| 7,257,113 | B2 | * | 8/2007 | O'Connor | 370/353 |
| 7,426,562 | B1 | * | 9/2008 | Johri | 709/226 |
| 7,558,284 | B2 | * | 7/2009 | Shinomiya et al. | 370/437 |
| 7,561,532 | B2 | * | 7/2009 | Bossi et al. | 370/255 |
| 2003/0002489 | A1 | * | 1/2003 | Bulick et al. | 370/354 |
| 2003/0023706 | A1 | * | 1/2003 | Zimmel et al. | 709/220 |
| 2003/0099014 | A1 | * | 5/2003 | Egner et al. | 359/124 |
| 2003/0145110 | A1 | * | 7/2003 | Ohnishi et al. | 709/242 |
| 2003/0158765 | A1 | * | 8/2003 | Ngi et al. | 705/7 |
| 2003/0172145 | A1 | * | 9/2003 | Nguyen | 709/223 |
| 2004/1024962 | | * | 12/2004 | Alicherry et al. | 703/21 |
| 2005/0060395 | A1 | * | 3/2005 | Korotky | 709/223 |
| 2005/0185967 | A1 | * | 8/2005 | Hoshida | 398/173 |
| 2005/0197993 | A1 | * | 9/2005 | Korotky | 706/52 |
| 2006/0067234 | A1 | * | 3/2006 | Bossi et al. | 370/238 |

* cited by examiner

*Primary Examiner*—Douglas B Blair
(74) *Attorney, Agent, or Firm*—Toler Law Group

(57) ABSTRACT

A system and method for Ethernet network design are disclosed. In one embodiment of a method incorporating teachings of the present disclosure, embedded network information describing at least one existing network element and a plurality of physical locations available for locating new network nodes may be inputted. A demand forecast for a coverage area of a proposed network may also be inputted. In an embodiment in which a to-be-designed network has at least a core layer and an aggregation layer, a number of core layer nodes and aggregator nodes to be included in the proposed network may also be inputted. Consideration may be given to these and other inputs in connection with generating a potential network design for the proposed network, and a cost of implementing the potential network design may be calculated.

31 Claims, 2 Drawing Sheets

SYSTEM AND METHOD FOR ETHERNET NETWORK DESIGN

FIELD OF THE DISCLOSURE

The present disclosure relates to network design, and more particularly to a system and method for Ethernet network design.

BACKGROUND OF THE DISCLOSURE

A network may be characterized by several factors like who can use the network, the type of traffic the network carries, the medium carrying the traffic, the typical nature of the network's connections, and the transmission technology the network uses. For example, one network may be public and carry circuit switched voice traffic while another may be private and carry packet switched data traffic. Whatever the make-up, most networks facilitate the communication of information between at least two nodes, and as such act as communications networks.

At a physical level, a communication network may include a series of nodes interconnected by communication paths. Whether a network operates as a local area network (LAN), a metropolitan area networks (MAN), a wide are network (WAN) or some other network type, the act of designing the network becomes more difficult as the size and complexity of the network grows. When designing a given network, an operator or provider may decide where to physically locate various network nodes, may develop an interconnection strategy for those nodes, and may prepare a list of deployed and/or necessary networking components.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

DETAILED DESCRIPTION OF THE DRAWINGS

Given the relative complexity of some communication networks, designers may invest a great deal of time and money trying to develop a feasible design for a given network. A feasible design may be one that satisfies design objectives like network coverage, network availability, and traffic demands, while taking into account design limiters like defined limitations on equipment and/or interconnection topology. A system and/or technique incorporating teachings of the present disclosure may assist these network designers and provide them with a mechanism for "optimizing" their network designs.

In practice, a designer may use the teachings disclosed herein to develop more than one feasible design. The designer may determine a relative and/or actual value that indicates which of the feasible designs comes closest to an optimal design. In practice, a to-be-developed network may be optimized to one or more criteria. For example, a network designer may be most concerned about deployment cost. As such, the designer may use the teachings disclosed herein and attempt to create a network design that defines the lowest cost yet feasible network. Another designer may be more concerned about sensitivity to link failures. That designer may optimize to some robustness or redundancy characteristic.

In one embodiment of a method incorporating teachings of the present disclosure, embedded network information describing at least one existing network element and a plurality of physical locations available for locating new network nodes may be input into a system. A demand forecast for a coverage area of a proposed network may also be input into the system. In an embodiment in which a to-be-designed network has at least a core layer and an aggregation layer, a number of core layer nodes and aggregator nodes to be included in the proposed network may also be input into the system. Consideration may be given to these and/or other inputs in connection with generating a potential network design for the proposed network, and a cost of implementing the potential network design may be calculated.

Such a methodology may help network designers develop robust yet affordable networks in a more timely and less costly manner. Moreover, systems and methods incorporating teachings of the present disclosure may also allow designers to more readily take into account relatively complex network challenges like load balancing, forecast sensitivity, and specific and/or random link failure effects.

Figure 1:
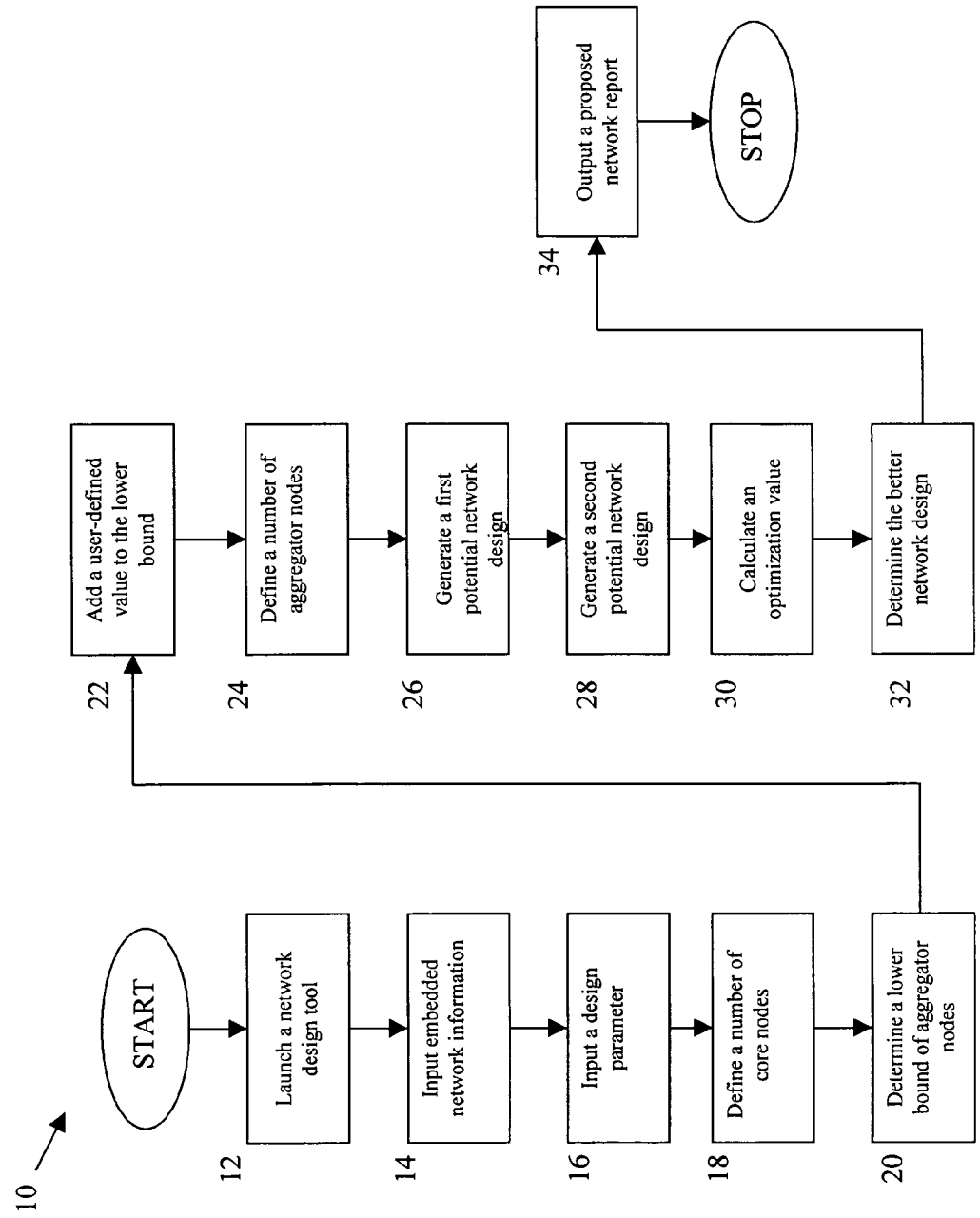
FIG. 1 presents a flow diagram for designing an Ethernet Optical Network in accordance with the teachings of the present disclosure.

As mentioned above in the brief description of the drawings, FIG. 1 presents a flow diagram for designing an Ethernet Optical Network (EON) in accordance with the teachings of the present disclosure. The following description focuses on EON design, but the techniques of FIG. 1 and this disclosure could also be used to design other types of networks.

As mentioned above, networks may take several forms. For example, a to-be-designed network may embody a high-speed, fiber-based, Ethernet over Multiprotocol Label Switching (MPLS) network. Using MPLS may allow an operator to integrate Layer 2 information about network links like bandwidth and latency into Layer 3. As such, in an MPLS-based network, a network operator may enjoy greater flexibility when routing traffic around link failures, congestion, and bottlenecks. From a Quality of Service (QoS) perspective, MPLS-based networks may also allow network operators to better manage different kinds of data streams based on priority and/or service plans.

In operation, a packet entering an MPLS network may be given a "label" by a Label Edge Router (LER). The label may contain information based on routing table entry information, the Internet Protocol (IP) header information, Layer 4 socket number information, differentiated service information, etc. As such, different packets may be given different Labeled Switch Paths (LSPs), which may "allow" network operators to make better decisions when routing traffic based on datastream type.

Technique 10 of FIG. 1 may begin at step 12, where a network designer may launch a network design tool. The tool may be local to a computer being accessed by the user. It may also be remotely located at a server, for example, and the user may access the tool from a local client. At step 14, embedded network information may be inputted to the tool. The embedded network information may describe at least one existing network element. It may also describe a collection of physical locations at which the designer may locate new network nodes. In some embodiments, the step of inputting embedded network information may involve contacting a repository maintaining the information. For example, a local computer may access remotely located TIRKS and/or EMS data to gather the embedded network information to be inputted.

At step 16, a design parameter may be input into the tool. For example, a network designer may want the tool to take into account a forecasted demand for the to-be-designed network, a price list for equipment to be included in the to-be-designed network, a design limitation for equipment to be included in the to-be-designed network, a number of nodes, some other design criteria, and/or a combination thereof.

At step 18, additional information may be input into the tool. This information may include for example a number of core layer network nodes. A designer may be using the tool to design an Ethernet Optical Network that has an access layer near the customer edge, and aggregation layer where access layer traffic is combined, and a core layer where much of the traffic communicated between different aggregator layer nodes is routed. The tool may be able to generate a "better" design more quickly if it is "told" how many core layer nodes to include and where to locate them.

At step 20, a lower bound number of aggregator layer nodes may be calculated. The lower bound number may be calculated in several different ways. For example, if a network designer has some idea of the to be designed network's forecasted traffic demands, the designer may determine the lower bound by taking the total traffic and dividing it by the capacity of a given aggregator node. The resulting number may represent a theoretical minimum number of aggregator layer nodes. However calculated, the lower bound number of aggregator layer nodes may very rarely be attainable.

As such, at step 22 a user-defined or system defined value may be added to the lower bound to present a more "realistic" number of potential aggregator layer nodes. The value may be zero in some cases. In other cases, the value may be an integer greater than zero. Whatever the value, a number of aggregator layer nodes to be deployed may be input into the tool at step 24. At step 26, the tool may consider the number and location of core nodes, the number of aggregator nodes, and any input design parameters to generate a first potential network design. At step 28, additional potential network designs may be generated.

In one embodiment, each of the different designs will include an aggregator node located in a different available location. The different designs may also differ from one another in other ways. For example, one design may include the input number of aggregator nodes while other designs may increment that value and include more or less aggregator nodes. At step 30, an optimized value for each of the designs may be calculated. If, for example, the designer seeks the lowest cost network, the optimized value may represent a total cost of deployment for each network. If the designer is more concerned with robustness, the optimization value may be associated with the robustness of the proposed designs.

Whatever the network design is being optimized to, at step 32 the "better" network design may be identified. At step 34, a proposed network report may be output. The network report may include various combinations of information. For example, the report may include a list, cost, and location of line cards to be installed in embedded equipment; a list, configuration, cost, and location of to be installed network nodes; a port-level connection report detailing how to interconnect the various network nodes; a total cost of deployment; an implementation schedule; and/or combinations of these and other information types.

As mentioned above, a network designer employing a technique like technique 10 to design a network may be able to work remotely from a server or computing platform executing instructions that effectuate technique 10. In such a system, the remote computing platform may include a computer-readable medium containing computer-readable instructions capable of instructing the platform to access embedded network information, to access a proposed number of core layer nodes for a network, to access a number of proposed aggregation layer nodes for the network, to consider a forecasted demand for the network, and to generate at least two potential network designs for the network.

The remote computing platform may also be able to identify a lower cost network from the at least two potential network designs. In operation, the platform may initiate presentation of a graphical user interface at a local and/or remote display that includes a field for receiving a user input defining the number of proposed aggregation layer nodes. In some systems, a computer-readable medium may maintain additional computer-readable data capable of directing a computing device to initiate retrieval of embedded network information from a remote repository. The remote repository may include a Trunk Inventory Record Keeping System (TIRKS®) and/or a network Element Management System (EMS).

In light of the potential authority granted to a remotely located designer, a system incorporating teachings of the present disclosure may elect to use some rights management technique. For example, the system may employ a security engine, which could include an authentication engine and an authorization engine. The authentication engine may be able to compare an initial set of credentials received from the remote designer against a maintained set of credentials. The credentials may include, for example, a user name and password combination. If the received credentials match the maintained credentials, the authorization engine may grant access to a network design tool that incorporates teachings of the present disclosure.

In some embodiments, various pieces of information including network information may be communication to and/or requested from a designer in a format that allows a graphical user interface to display textual information and a visual representation of the to-be-designed network. As mentioned above, FIG. 2 shows one embodiment of a system 50 and graphical user interface (GUI) 52 that incorporate teachings of the present disclosure to facilitate development of improved network designs. GUI 52 may be presented within a display associated with an access device 53. GUI 52 may include a browser bar portion 54 and a display portion 56. Display portion 56 may contain several active elements 58, 60, and 62.

In operation, device 53 may include a network interface 64 that can form at least a portion of a communication link that spans a network 66 and interconnects device 53 and remote server 68, server 68 may have an associated repository 70 that maintains embedded network information. The embedded network information may help a designer attempting to lay out a new network design. For example, a designer may seek to develop an Ethernet Optical Network 72 employing MPLS. Proposed network 72 may include a core layer 74, an aggregator layer 76, and an access layer 78. As shown, a graphical representation of network 72 may be displayed to a user in GUI element 60. The circles included in the display may represent physical locations available within the network for locating network nodes. As such, location 80 may represent a place in the network where an aggregator layer node may be deployed.

Figure 2:
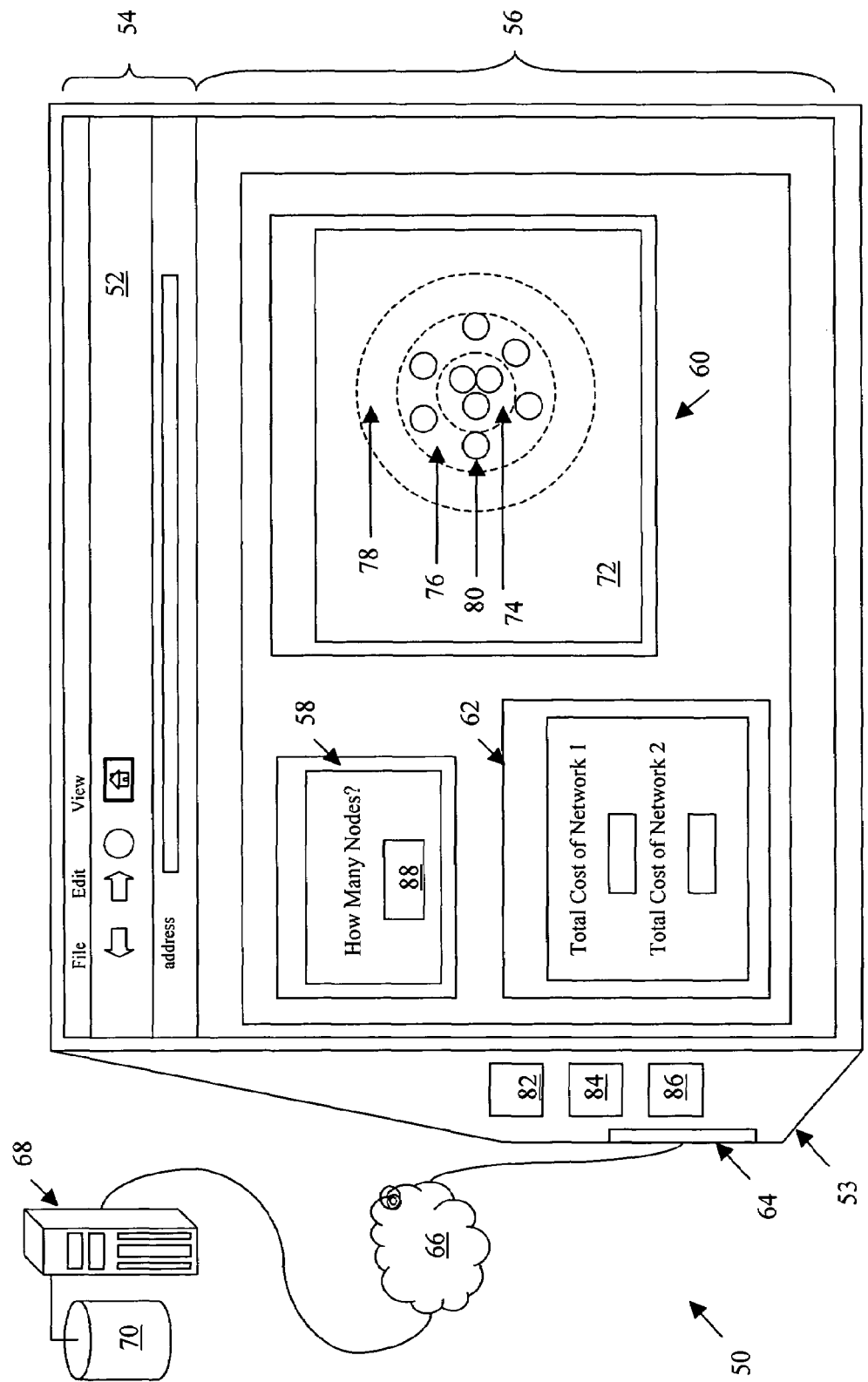
FIG. 2 shows one embodiment of a graphical user interface and system that incorporate teachings of the present disclosure to facilitate development of improved network designs.

In the depicted network 72 of FIG. 2, access layer 78 may represent a Provider Edge—Customer Location Equipment (PE-CLE) location. Aggregator layer 76 may represent a Provider Edge—Point of Presence (PE-POP) location. The aggregator layer nodes may be MPLS capable and may serve as the LER into the MPLS cloud. In some to-be-designed networks, a designer may know design criteria for the nodes of the various layers. For example, network 72 may be designed such that aggregator layer nodes do not connect to one another but are connected to at least two core nodes. Other requirements, preferences, and/or criteria may be input into the tool to help ensure that output network designs are feasible.

Whatever the design criteria, a design engine 82 may be capable of generating at least two proposed network designs each including at least one deployed network node described in the embedded network information. Similarly, an optimization engine 84 may be capable of determining which proposed network design is optimal or near optimal. If the design is being optimized for low cost deployment, optimization engine 84 may act as a costing engine and may be capable of determining a lower cost proposed network from the at least two proposed network designs.

To facilitate interaction with the designer, a system like system 50 may include an output engine 86. Output engine 86 may be capable of causing the presentation of interactive GUI elements like elements 58 and 62. As shown, element 58 may request an inputting of some design criteria from the designer. In the embodiment of FIG. 2, the designer is being asked to input a number of nodes to be included in the proposed network. The designer may respond to the request by populating field 88.

Similarly, element 62 may present the designer with a list of proposed network designs in connection with the optimization value for each design. As depicted in FIG. 2, the optimization value may be associated with some total cost of the network value. In preferred embodiments, the displayed value be presented in hypertext. In response to a designer selecting a given value, device 53 may cause a more detailed network report to be presented to the designer.

Many of the above techniques may be provided by a computing device executing one or more software applications or engines. The software may be executing on a single computing platform or more than one. The platforms may be highly capable workstations, personal computers, microprocessors, servers, or other devices capable of performing the techniques. It will be apparent to those skilled in the art that the disclosed embodiments may be modified in numerous ways and may assume many embodiments other than the particular forms specifically set out and described herein.

Accordingly, the above disclosed subject matter is to be considered illustrative, and not restrictive, and the appended claims are intended to cover all such modifications, enhancements, and other embodiments that fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A network design method executable by at least one computer, the method comprising:

inputting embedded network information describing at least one existing network element and a plurality of physical locations available for locating new network nodes;

inputting a demand forecast for a coverage area of a proposed network having a core layer, an aggregation layer, and an access layer;

inputting a number of core layer nodes to be included in the proposed network;

determining a lower bound number of aggregator layer nodes to service the coverage area;

determining a number of aggregator layer nodes to be included in the proposed network by adding a positive integer quantity to the lower bound number of aggregator layer nodes;

generating a potential network design for the proposed network;

locating each of the core layer nodes and aggregator layer nodes of the potential network design at an assigned physical location of the plurality of physical locations available; and calculating a cost of implementing the potential network design.

2. The method of claim 1, wherein the potential network design comprises a list of line cards to be added to existing network elements, a list of to be added core layer nodes and aggregator layer nodes, and connection information describing an interconnection plan.

3. The method of claim 2, wherein the cost of implementing the potential network design comprises an equipment cost for the core layer nodes and aggregator layer nodes and an interconnection cost for the interconnection plan.

4. The method of claim 1, further comprising:

generating a second potential network design for the proposed network, wherein at least one network node has an altered assigned physical location that is different than the assigned location for the at least one node in the potential network design; and calculating a cost of implementing the second potential network design.

5. The method of claim 4, further comprising comparing the cost of implementing the second potential network design to the cost of implementing the potential network design.

6. The method of claim 1, further comprising gathering embedded network information from a remote repository.

7. The method of claim 1, further comprising gathering embedded network information from a network Element Management system.

8. The method of claim 1, wherein the positive integer quantity is a user-defined integer.

9. The method of claim 1, further comprises outputting a proposed network report.

10. The method of claim 9, wherein the network report comprises cost of implementing the potential network design and a list of equipment to be deployed in accordance with the potential network design.

11. The method of claim 1, wherein the proposed network comprises an Ethernet optical network.

12. The method of claim 11, wherein the proposed network is a Multiprotocol Label Switching based network.

13. A computer-readable medium having computer-readable instructions executable by a processor to:

access embedded network information;

access a proposed number of core layer nodes for a to-be-designed network;

determine a lower bound number of aggregator layer nodes to service a coverage area of the to-be-designed network;

determine a number of aggregator layer nodes to be included in the to-be-designed network by adding a positive integer quantity to the lower bound number of aggregator layer nodes;

consider a forecasted demand for the to-be-designed network;

consider a price list for equipment to be included in the to-be-designed network;

generate at least two potential network designs for the to-be-designed network;

locate each of the core layer nodes and aggregator layer nodes at an assigned physical location of the at least two potential network designs;

identify a lower cost proposed network from the at least two potential network designs; and output data, wherein the data is based at least in part on one of the potential network designs.

14. The computer-readable medium of claim 13, further comprising computer-readable instructions executable by a processor to initiate presentation of a graphical user interface, the presentation comprising a field for receiving a user input defining the number of proposed aggregation layer nodes.

15. The computer-readable medium of claim 13, further comprising computer-readable instructions executable by a processor to initiate retrieval of the embedded network information from a remote repository.

16. The computer-readable medium of claim 13, wherein the proposed network comprises a Multiprotocol Label Switching based Ethernet Optical Network.

17. The computer-readable medium of claim 13, wherein the positive integer quantity is a user-defined integer.

18. A network design system, comprising:

a network interface device operable to form at least a portion of a communication link between a local component and a remote memory maintaining embedded network information;

a design engine operable to:
generate at least two proposed network designs each including at least one deployed network node described in the embedded network information;

locate the at least one deployed network node at a physical location for each of the at least two proposed network designs;

determine a lower bound number of aggregator layer nodes to service a coverage area of the at least two proposed network designs; and consider at least one design parameter in connection with generating the at least two proposed network designs for a to-be-designed network, the at least one design parameter comprising a price list for at least one piece of equipment to be included in the to-be-designed network, wherein the at least one design parameter further comprises a number of aggregator layer nodes determined by adding a positive integer quantity to the lower bound number of aggregator layer nodes; and a costing engine operable to determine a lower cost proposed network from the at least two proposed network designs.

19. The system of claim 17, further comprising a user interface operable to receive the at least one design parameter for a to-be-designed network.

20. The system of claim 19, further comprising an output engine operable to initiate presentation of design details for the lower cost proposed network.

21. The system of claim 19, wherein the to-be-designed network comprises a Multiprotocol Label Switching based Ethernet Optical Network.

22. The system of claim 19, wherein the at least one design parameter further comprises a number of core layer nodes.

23. The system of claim 19, wherein the at least one design parameter further comprises a forecasted demand for the to-be-designed network.

24. The system of claim 19, wherein the at least one design parameter further comprises a design limitation for at least one piece of equipment to be included in the to-be-designed network.

25. The system of claim 18, wherein the positive integer quantity is a user-defined integer.

26. An Ethernet network design method comprising:

determining a lower bound number of aggregator layer nodes to service a coverage area of a to-be-designed Ethernet optical network;

receiving a user input comprising at least one design parameter for the to-be-designed Ethernet optical network, wherein the at least one design parameter comprises a price list for at least one piece of equipment to be included in the to-be-designed network, wherein the at least one design parameter further comprises a number of aggregator layer nodes determined by adding a positive integer quantity to the lower bound number of aggregator layer nodes;

generating at least two different potential network designs for the to-be-designed network;

locating the at least one piece of equipment at a physical location for each of the at least two different potential network designs; and calculating a cost of implementing at least one of the at least two different potential network designs.

27. The method of claim 26, further comprising considering embedded network elements in connection with generating the at least two different potential network designs.

28. The method of claim 26, wherein the at least one design parameter comprises a number of core layer nodes.

29. The method of claim 26, wherein the at least one design parameter comprises a forecasted demand for the to-be-designed network.

30. The method of claim 26, wherein the at least one design parameter comprises a design limitation for at least one piece of equipment to be included in the to-be-designed proposed network.

31. The method of claim 26, wherein the positive integer quantity is a user-defined integer.

* * * * *